3,716,459
ELECTROCHEMICAL PROCESSES
David Stanley Salter, Horsham, and David Henry Smith, Guildford, England, assignors to Constructors John Brown Limited, London, England
Filed Oct. 16, 1969, Ser. No. 866,956
Int. Cl. B01k 3/00
U.S. Cl. 204—1 R
11 Claims

ABSTRACT OF THE DISCLOSURE

Electrochemical processes wherein at least one of the electrodes at which electron transfer occurs comprises a mass of discrete particles of particle size up to 2000μ which particles are comprised of a material selected from the group consisting of electrically conductive and partially electrically conductive materials, the mass of particles being supported on a fluid-permeable support and wherein a fluid is caused to flow upwards through the mass of particles in such a manner as to impart movement to the particles, the degree of upward movement of the particles in the fluid stream being limited by a particle-impermeable barrier positioned above the particle bed so that the volume occupied by the particles is less than the volume which the particles would occupy as a fluidised bed.

---

Figure 1:
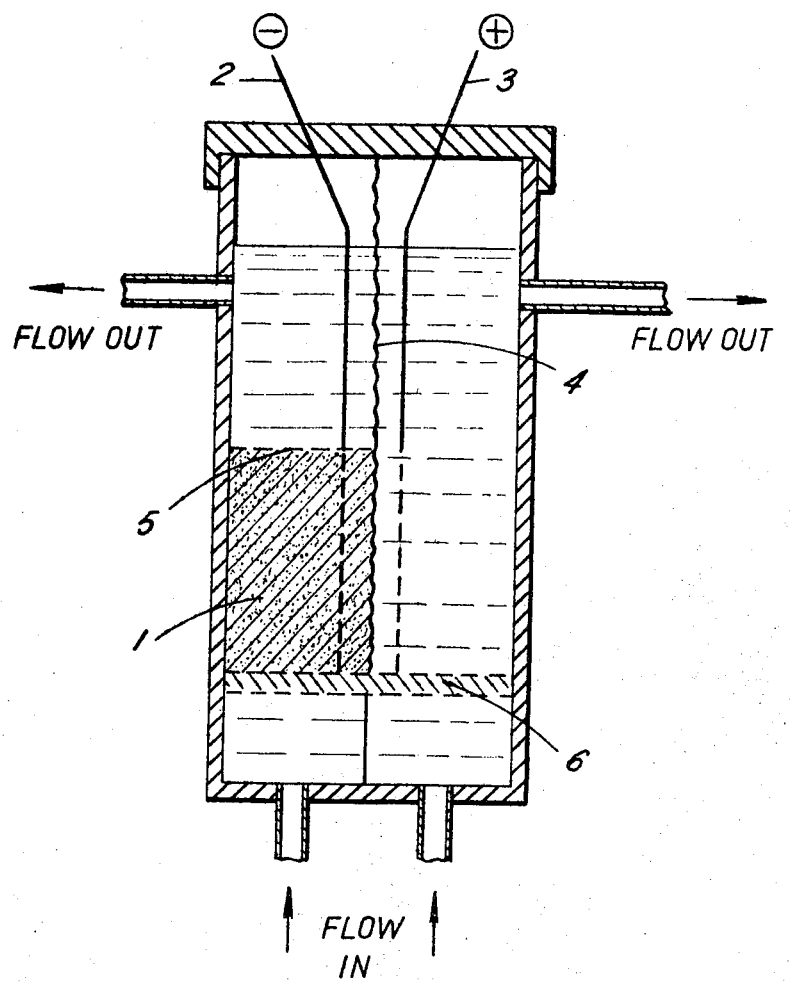

This invention relates to electrochemical processes.

The electrochemical processes with which the present invention is concerned include all processes involving electron transfer at a solid-fluid interface and in which a chemical change takes place, and include processes wherein oxidation or reduction of chemical species is achieved by applying a positive or negative charge to the electrode forming the solid interface and also processes wherein a chemical reaction is used to produce electricity, as for example in fuel cells.

According to the present invention there are provided electrochemical processes wherein at least on of the electrodes at which electron transfer occurs comprises a mass of discrete particles of particle size up to 2000μ which are electrically conductive or which are at least partially electrically conductive, the said mass of particles being supported on a fluid-permeable support, and wherein a fluid comprising the electrolyte and/or the reactant or reactants for the electrochemical reaction is caused to flow upwards through the said mass of particles in such a manner as to impart movement to the particles, the degree of upward movement of the particles in the fluid stream being limited by a particle-impermeable barrier positioned above the particle bed so that the volume occupied by the moving particles is less than the natural volume which the particles would occupy as a fluidised bed in the absence of the said particle-impermeable barrier.

The particles forming the electrode may be constituted wholly of an electrically conducting material, such as a metal, or may for example comprise a poorly-conducting core, such as glass, ceramics or plastic materials having a surface which is conductive or which has parts having a good conductivity. Alternatively the particles may be a semi-conducting material such as graphite. Preferably however the particles are wholly conducting, and are comprised of solid metals or alloys, such as, for example, copper, nickel, lead or Monel. (Monel is a Registered Trade Mark). The particles themselves may take part in the electrochemical reaction.

The particles forming the electrode are generally of particle size from 70μ to 1000μ, and may thus be described as powders. Preferably the particles are of particle size in the range 100μ to 250μ.

Particles of any shape may be used. However, it is preferred to use particles of fairly even major dimensions and thus granular lumps are preferred to needle shaped particles, and substantially spherical particles are still more preferable than granular lumps.

The particles constituting the electrode will normally be employed in conjunction with an electrically conductive member which can form an effective contact with the mass of particles constituting the electrode and which is capable of conducting an electrical charge between the particles and the exterior of the cell or half-cell in which the electro-chemical process is being performed. The said conductive member may itself form the wall or part of the wall of the enclosure containing the particulate electrode.

The fluid comprising the electrolyte and/or the reactant or reactants will usually be a liquid, and will normally be pumped through the particulate e lectrode. It will however be understood that in some reactions, one or more of the reactants may be gaseous. Means may be provided for controlling the rate at which the fluid is passed through the electrode.

Figure 2:
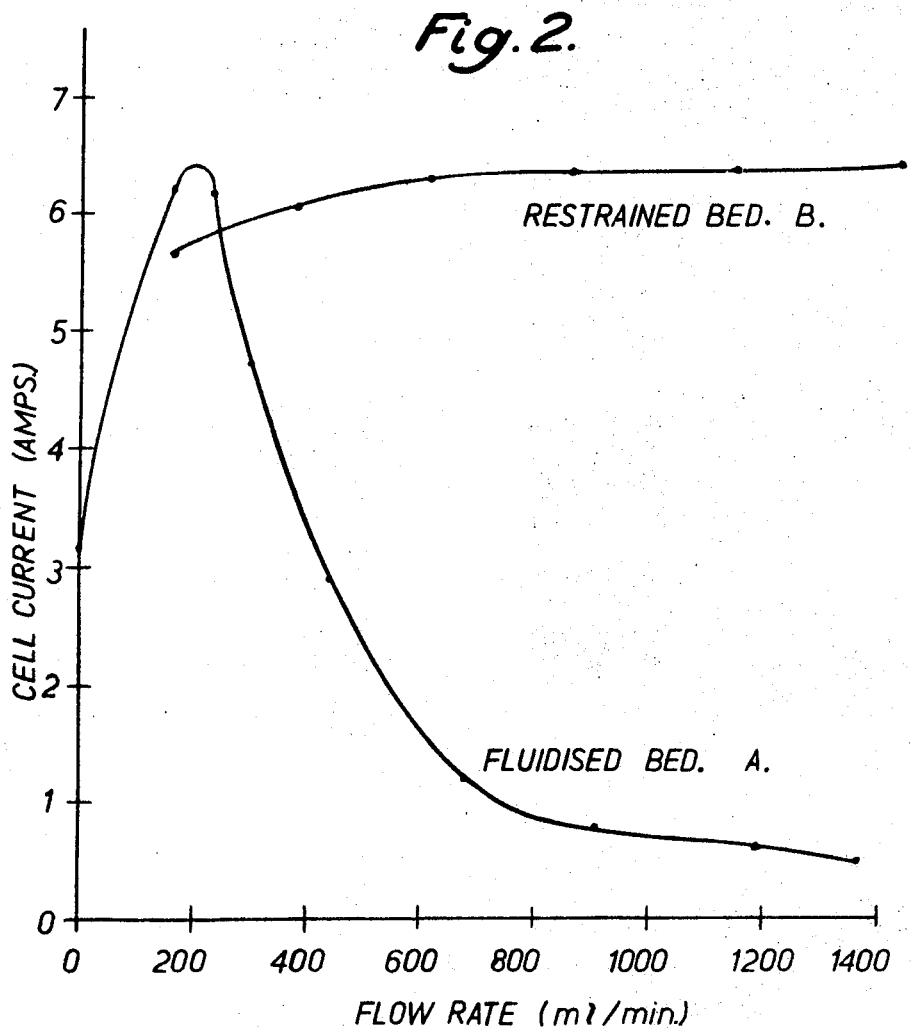

The practice of the present invention will now be illustrated with reference to the accompanying drawings in which:

FIG. 1 is a diagrammatic representation of the diaphragm cell which was employed; and FIG. 2 illustrates the results obtained and is a graph of cell current versus flow rate for the reduction of meta-nitrobenzene sulphonic acid at a copper powder electrode at constant cathode potential.

The particular electrochemical process exemplified is the reduction of meta-nitrobenzene sulphonic acid in aqueous solution. This reaction proceeds at an electrical potential less negative than —0.8 volt relative to a saturated Calomel electrode, depending on the electrode material, in a solution containing 0.125 molar meta-nitrobenzene sulphonic acid and molar sulphuric acid at room temperature. The current density on the individual particles for the reaction is about 2 amps/sq. ft. The current efficiency is highest at even lower current densities and when the electrolyte temperature is raised.

The diaphragm cell shown in FIG. 1 which was used for these experiments comprises a bed 1 of copper particles forming the cathode of the cell, the breadth of the bed being 0.5 inch and the height of the bed being 1.5 inches. The cathode current carrier 2 in the form of a copper gauze was positioned 0.2 inch from the cell diaphragm 4 which was of "Terylene" cloth. A platinum anode 3 was positioned 0.2 inch away from the diaphragm 4 on the other side of the diaphragm. The cathode particle bed rested on a permeable support or diffuser 6. The bed was about 1 inch in thickness.

The anolyte liquid was molar sulphuric acid in water.

The cell current was then measured at various increasing flow rates of electrolyte through the cell at constant electrode potential. The results are shown in the form of curve A in FIG. 2. It will be seen that when the particles of the cathode bed are free to move in the electrolyte stream an optimum current is achieved at a certain flow rate, the current decreasing sharply as the flow rate is either lowered or raised relative to the optimum flow rate.

In a further series of experiments a porous confining barrier 5 was positioned above the particle bed to limit the free movement of the particles in the electrolyte stream. It was found that by this means an optimum cell current could be maintained up to higher flow rates, as shown in curve B of FIG. 2 of the accompanying drawings.

An important advantage of processes of the present invention as exemplified above is thus that the cell current is less dependent on the flow rate of the electrolyte or reactant through the electrodes than processes in which the particulate bed is fully fluidised and in which the particulate bed is not restrained. It is to be understood however that the limiting case where the particulate bed is completely stationary, does not fall within the scope of the present invention.

The process of the present invention may however be performed for example by alternating the rate of flow of the electrolyte in a pulsed manner such that for a period the particles of the electrode bed are physically restrained at a high flow rate and then are caused to be stationary by reducing the flow rate below that at which the particles comprising the particle bed are disturbed by the flow.

The processes of the present invention may be particularly useful in cells having a lower portion which is conical or wedge-shaped and in which the electrolyte entering the cell has a higher velocity than when it passes through the bed. The use of an electrolyte diffuser under the particle bed may in such cases be unnecessary.

We claim:

1. An electrochemical process comprising flowing a fluid selected from the group consisting of electrolyte, electrolyte and reactant mixture and reactants alone, upwards through a particulate electrode comprising a bed of discrete particles of particle size up to $2000\mu$ which particles are comprised of a material selected from the group consisting of electrically conductive and partially electrically conductive materials, the said mass of particles being supported on a fluid permeable support, in such a manner as to impart movement to the particles, limiting the degree of upward movement of the particles in the fluid stream by a particle-impermeable barrier permeable to the fluid and positioned above the particle bed so that the volume occupied by the moving particles is less than the natural volume which the particles would occupy as a fluidised bed in the absence of the said particle-impermeable barrier and causing electron transfer to occur at said electrode.

2. An electrochemical process comprising flowing a fluid selected from the group consisting of electrolyte, electrolyte and reactant mixture and reactants alone, upwards through a particulate electrode comprising a bed of discrete particles of particle size in the range of from $75\mu$ to $1000\mu$, which particles are comprised of a material selected from the group consisting of electrically conductive and partially electrically conductive materials, the said mass of particles being supported on a fluid-permeable support, in such a manner as to impart movement to the particles, limiting the degree of upward movement of the particles in the fluid stream by a particle-impermeable barrier permeable to the fluid and positioned above the particle bed so that the volume occupied by the moving particles is less than the natural volume which the particles would occupy as a fluidised bed in the absence of the said particle-impermeable barrier and causing electron transfer to occur at said electrode.

3. Electrochemical processes as claimed in claim 2 wherein the particles forming the electrode are employed in conjunction with an electrically conductive member.

4. Electrochemical processes as claimed in claim 3 wherein the said conductive member itself forms the wall or part of the wall of the enclosure containing the particulate electrode.

5. Electrochemical processes as claimed in claim 2 wherein the fluid which flows upwards through the particles is a liquid.

6. Electrochemical processes as claimed in claim 2 wherein the fluid which flows upwards through the particles is a liquid which is pumped through the particulate electrode.

7. Electrochemical processes as claimed in claim 2 wherein the particles forming the electrode are comprised of a metal or an alloy.

8. Electrochemical processes as claimed in claim 2 wherein the particles forming the eelctrode are of particle size in the range of from $100\mu$ to $250\mu$.

9. Electrochemical processes as claimed in claim 2 wherein the rate of flow of electrolyte is alternated in a pulsed manner such that for a period the particles of the electrode bed are restrained by the particle-impermeable barrier and are then caused to be stationary by reducing the flow rate below that at which the particles comprising the particulate bed are disturbed by the flow.

10. An electrochemical process comprising flowing a fluid selected from the group consisting of electrolyte, electrolyte and reactant mixture and reactants alone, upwards through an electrochemical cell having a conical or wedge-shaped lower portion and through a particulate electrode in said cell comprising a bed of discrete particles of particle size in the range $75\mu$ to $1000\mu$ which particles are comprised of a material selected from the group consisting of electrically conductive and partially electrically conductive materials, said fluid being introduced through the conical or wedge-shaped lower portion of the cell and then passing upwards through said bed of particles in such a manner as to impart movement to the particles, limiting the degree of upward movement of the particles in the fluid stream by a particle-impermeable barrier permeable to said fluid positioned above the particle bed so that the volume occupied by the moving particles is less than the natural volume which the particles would occupy as a fluidised bed in the absence of the said particle-impermeable barrier and causing electron transfer to occur at said electrode.

11. An electrochemical process as claimed in claim 1 wherein a diaphragm is situated between said particulate electrode and another electrode spaced horizontally therefrom to provide separate electrode compartments, current is caused to flow between said electrodes and the degree of upward movement of the particles in the fluid stream is limited by positioning said particle-impermeable, fluid-impermeable barrier above the particle bed and substantially perpendicularly to the direction of flow of the fluid stream and substantially parallel to the direction of current flow between the electrodes.

References Cited

UNITED STATES PATENTS

| 522,415 | 7/1894 | Huber et al. | 204—23 |
| 3,316,126 | 4/1967 | LeDuc | 136—86 A |

OTHER REFERENCES

"Industrial and Engineering Chemistry," vol. 61, No. 10, October 1969.

"New Scientist," February 1968, p. 303.

"Nature," vol. 223, September 1969, pp. 1054–1055.

LeGoff et al., "Industrial & Engineering Chem.," vol. 61, No. 10, October 1968, pp. 8–17.

TA-HSUNG TUNG, Primary Examiner

U.S. Cl. X.R.

204—23